Nov. 8, 1960

E. P. REBNORD 2,959,121

CHECK PROTECTOR

Filed Sept. 8, 1958

2 Sheets-Sheet 1

INVENTOR.
Edward P. Rebnord
BY
Sam J. Slotsky
ATTORNEY

Nov. 8, 1960 E. P. REBNORD 2,959,121
CHECK PROTECTOR

Filed Sept. 8, 1958 2 Sheets-Sheet 2

INVENTOR.
Edward P. Rebnord
BY
ATTORNEY

United States Patent Office 2,959,121
Patented Nov. 8, 1960

2,959,121
CHECK PROTECTOR

Edward P. Rebnord, 1015 S. Minnesota Ave., Sioux Falls, S. Dak.

Filed Sept. 8, 1958, Ser. No. 759,766

1 Claim. (Cl. 101—19)

My invention relates to a check protector.

An object of my invention is to provide a check protector which is very compact in structure, requires very little space, and can be operated in a very simple manner.

A further object of my invention is to provide a check protector which is of reduced size, and which will still perform the check protecting functions satisfactorily.

Figure 1:
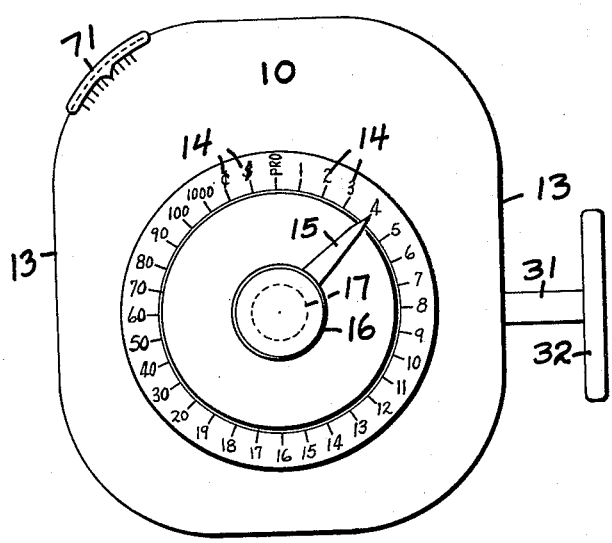
Figure 3:
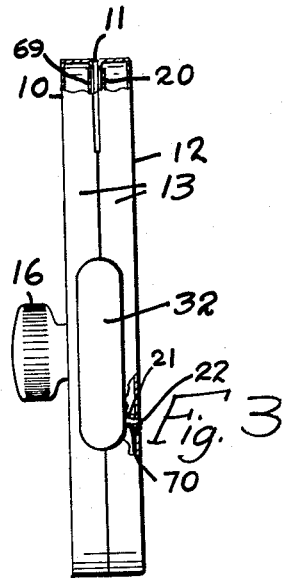
Figure 2:
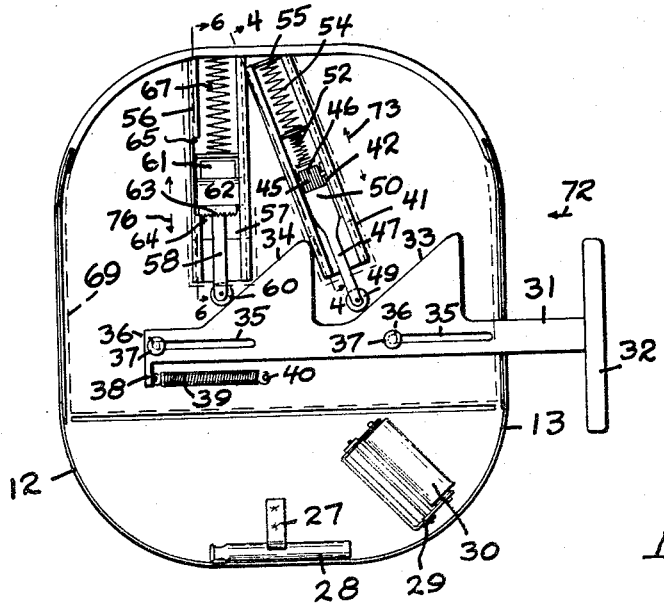
Figure 4:
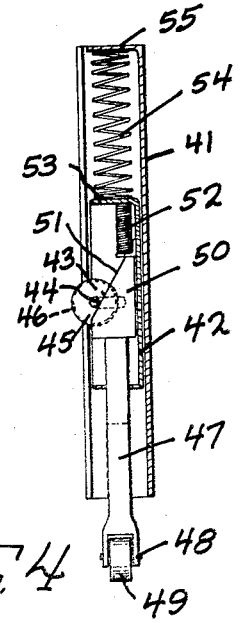
Figure 5:
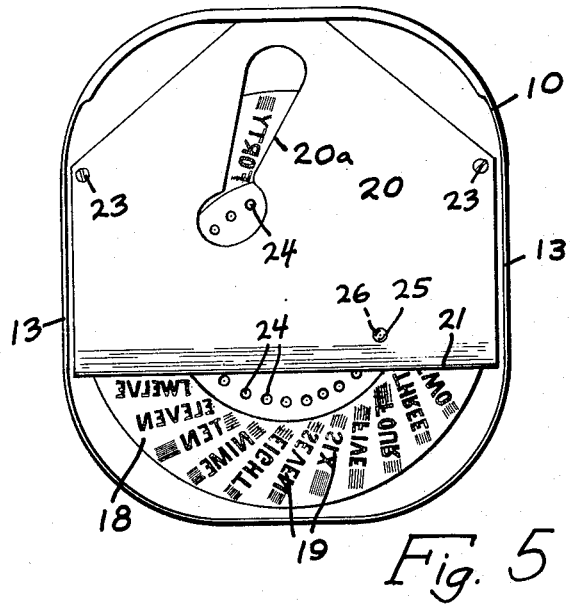
Figure 7:
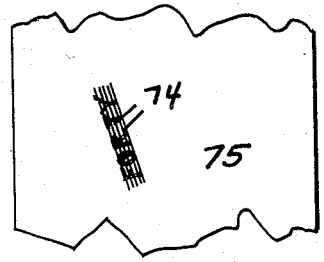
Figure 6:
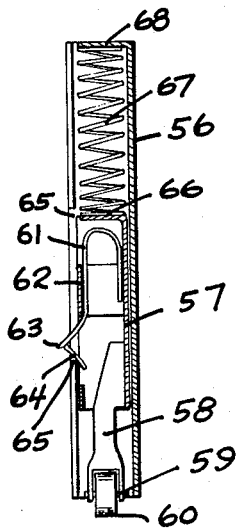

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a forward elevation of the check protector,

Figure 2 is an elevation of the inside of the check protector with the forward casing removed, Figure 3 is an end view of the protector with fragmentary sections, Figure 4 is an enlarged sectional view taken generally along the lines 4—4 of Figure 2, Figure 5 is an elevation of the rear casing portion, Figure 6 is an enlarged sectional view taken along the lines 6—6 of Figure 2, and Figure 7 is a plan view of a check showing the appearance of the same when one of the numbers has been printed by means of the check protector.

My invention contemplates the provision of a simple check protector which is of a very small size, and thereby not necessitating the use of large cumbersome protectors, and further contemplates the provision of a check protector which can be operated by one hand.

I have used the character 10 to designate a forward casing of my check protector, this casing including an indented portion at 11, the character 12 indicating the rear casing, these casings having the perimetral flanges 13.

Marked on the casing 10 are a series of symbols and numbers 14 indicating the numbers 1, 2, and up to 1,000 with further markings being as shown.

Adapted to register with any of these markings is a pointer 15 which is secured to a manually rotatable knob 16, and attached to the knob 16 is a shaft 17 which extends into the casing 10 and which shaft is attached to a rotatable disc 18 which also has the numbers etc. 19 printed thereon in raised letters, each of which numbers corresponds to one of the indicia 14, and for instance as shown in Figure 5, assuming that the pointer 15 is on the indicia No. "40" it will be observed that the corresponding word "Forty" will be in operating position, or will be able to operate through the opening 20a provided in the guard 20, the character 20 indicating a guard terminating in the lower arcuate portion 21 (see Figure 3) which is adjacent to the opening 22 in the casing portion 12. The guard 20 can be secured by means of suitable screws 23.

The disc 18 includes a series of small depressions 24 therein, each depression corresponding to each number, etc., and the guard 20 includes a small depression 25 therein which carries a small spring-urged ball 26 adapted to register with any one of the openings 24, so that as the disc 18 is rotated, it will remain fixed for any desired number or symbol.

The casing 12 (see Figure 2) includes a small clip 27 which is adapted to secure a small bottle 28 which contains a suitable red ink, and the character 29 indicates a holder which is adapted to hold the absorbent cylindrical member 30, upon which member 30 is spread a quantity of this red ink.

The character 31 indicates a bar to which is attached the manipulating handle 32, the bar 31 including the sloping cam portions 33 and 34 formed integrally therewith, the bar 31 also including the slots 35 which receive the pins 36 which are attached to the casing 12, the pins including the expanded portions 37. Forming a further part of the bar 31 is the extending portion 38 which is secured to the rather strong tension spring 39 which is secured at 40 to the casing 12.

The character 41 indicates a channel in which is received the slidable carriage 42. The carriage 42 includes the slots 43 in which slots is received a transverse shaft 44 which is attached to a roller 45, which roller 45 includes a series of V-shaped grooves 46 therein, and the character 47 indicates a bar to which is journalled at 48 a roller 49 which roller bears against the cam surface 33. Attached to the bar 47 is the wedge-shaped member 50 having the sloping surface 51, and attached at the end of the member 50 is the compression spring 52.

The carriage 42 terminates in the portion 53 which bears against the spring 54, which spring bears against the end 55 of the channel 41.

The character 56 indicates a further channel (see Figures 2 and 6), the character 57 indicating a further carriage received in the channel 56, and attached to the carriage 57 is a bar 58 to which is journalled at 59 a further roller 60 which bears against the cam surface 34, and attached to the carriage 57 is the bent spring member 61 which passes beneath the portion 62, the member 61 terminating in the toothed portion 63 and with this toothed portion also including the extending portion 64, the portions 64 and 63 passing within the open portion 65 provided in the channel 56, the carriage portion 57 extending into the portion 66 which bears against the compression spring 67 which bears against the portion 68, which portion 68 is a continuation of the channel 56.

The character 69 indicates by dotted lines a further plate or guard member which is shown in dotted lines so as not to confuse the construction, this plate or guard member covering most of the mechanism with the exception of the channels 41 and 56, and terminating in the curved portion 70 (see Figure 3).

The character 71 indicates a slidable member which can be slidably engaged with one corner of the casing so as to regulate the width of the checks which are to be protected.

The device operates in the following manner. The check which is to be protected is first inserted in the opening at 11 and is forced downwardly a slight distance until it reaches the operating mechanism, and then the pointer 15 is first placed on the first number on the check. Assuming that the check is for Forty dollars, the pointer is first placed on "40" as described hereinabove, and then the entire casing is held in the hand and the handle 32 is pressed inwardly by means of the fingers, which correspondingly carries the cam surfaces 33 and 34 inwardly, or in the direction of the arrow 72. The marking "Forty," meanwhile, since it has passed over the member 30, will be covered with red ink, in fact, all of the markings will be constantly covered with red ink since they will automatically be coated as the disc 18 rotates. As the bar 31 is forced inwardly, the roller 49 will bear against the surface 33 and will be raised in the direction of the arrow 73 to correspondingly cause the roller 45 to rise in the slots 43 and at the same time the sharpened V-shaped portions 46 will press against the check and will provide the markings 74 as shown in Figure 7 on the check 75. Meanwhile, the projection 64 (see Figure 6) in the other channel 56 has been forced upwardly as has the carriage 57 by virtue of the fact that the roller 60 bears against the cam surface 34, which will cause the teeth 63 to spring out, and when the handle 32 is released, the spring 39 will carry the handle in the reverse direction, and as the teeth travel in the direction of the arrow 76 (see Figure 2) they will be forced into the check and it will correspondingly carry the check downwardly on the retractable motion, and for each number or symbol the handle 32 is pressed inwardly, and for instance in describing the above action, the next symbol will be "Dollars," the pointer 15 being placed on the dollar sign, so that therefore, the term "Dollars" will be the next mark after "Forty" and will be spaced downwardly along the check. In this way the check will bear the markings with the proper scoring in red ink, which cannot be erased or changed, and the check will pass through the opening 22 and will be delivered fully protected.

It will now be seen that I have provided the advantages mentioned in the objects of my invention with further advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

A check protector comprising a casing, said casing including an annularly arranged indicating scale having indicia thereon, a rotatable knob including a pointer adapted to register with any of said indicia, a disc in said casing rotated by said knob, an ink roller in said casing contacting said disc, said disc including raised further indicia corresponding to said annularly arranged indicia, said casing having an upper opening for receiving a check therethrough, a pair of channels in said casing, one of said channels including a retractable roller having sharpened grooves, the other of said channels including a retractable toothed member for pulling checks downwardly, a retractable operating handle co-acting with said roller and said toothed member, said handle member including a pair of sloping cam surfaces, further rollers bearing against said cam surfaces, support members to which said further rollers are journalled, said support members being secured to said roller and said toothed member, said sharpened grooves being adapted to be forced against said check to provide scoring thereto when said check is impressed against said further indicia, said retractable handle being positioned generally at right angles to said channels and being enclosed by said casing.

References Cited in the file of this patent

UNITED STATES PATENTS

| | | |
|---|---|---|
| 1,161,808 | Bilyeu | Nov. 23, 1915 |
| 1,252,787 | Cumpston | Jan. 8, 1918 |
| 1,281,652 | Plant | Oct. 15, 1918 |
| 1,293,988 | Todd et al. | Feb. 11, 1919 |
| 1,307,567 | Tiefel | June 24, 1919 |
| 1,358,458 | O'Donnell et al. | Nov. 9, 1920 |